(12) United States Patent
Munoz Delgado

(10) Patent No.: US 11,810,341 B2
(45) Date of Patent: Nov. 7, 2023

(54) METHOD OF IDENTIFYING FILTERS IN A NEURAL NETWORK, SYSTEM AND STORAGE MEDIUM OF THE SAME

(71) Applicant: Robert Bosch GmbH, Stuttgart (DE)

(72) Inventor: Andres Mauricio Munoz Delgado, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 366 days.

(21) Appl. No.: 17/145,271

(22) Filed: Jan. 8, 2021

(65) Prior Publication Data
US 2021/0248423 A1    Aug. 12, 2021

(30) Foreign Application Priority Data

Feb. 10, 2020 (EP) ..................................... 20156358

(51) Int. Cl.
*G06V 10/82* (2022.01)
*G06N 3/04* (2023.01)
(Continued)

(52) U.S. Cl.
CPC ............ *G06V 10/82* (2022.01); *G06F 18/217* (2023.01); *G06F 18/22* (2023.01); *G06F 18/23* (2023.01);
(Continued)

(58) Field of Classification Search
CPC .. G06V 10/82; G06V 10/774; G06V 10/7784; G06F 18/217; G06F 18/22;
(Continued)

(56) References Cited

U.S. PATENT DOCUMENTS

| 10,572,760 B1* | 2/2020 | Wu ........................... G06T 7/73 |
| 2019/0258901 A1* | 8/2019 | Albright ................ G06N 3/084 |

(Continued)

FOREIGN PATENT DOCUMENTS

CN        109949200 B   * 10/2022

OTHER PUBLICATIONS

"Relating Input Concepts to Convolutional Neural Network Decisions", Ning Xie, Md Kamruzzaman Sarker, Derek Doran, Pascal Hitzler, Michael Raymer (Year: 2017).*
(Continued)

*Primary Examiner* — Matthew C Bella
*Assistant Examiner* — Pardis Sohraby
(74) *Attorney, Agent, or Firm* — NORTON ROSE FULBRIGHT US LLP; Gerard Messina

(57) ABSTRACT

A computer-implemented method of identifying filters for use in determining explainability of a trained neural network. The method comprises obtaining a dataset comprising the input image and an annotation of an input image, the annotation indicating at least one part of the input image which is relevant for inferring classification of the input image, determining an explanation filter set by iteratively: selecting a filter of the plurality of filters; adding the filter to the explanation filter set; computing an explanation heatmap for the input image by resizing and combining an output of each filter in the explanation filter set to obtain the explanation heatmap, the explanation heatmap having a spatial resolution of the input image; and computing a similarity metric by comparing the explanation heatmap to the annotation of the input image; until the similarity metric is greater than or equal to a similarity threshold; and outputting the explanation filter set.

16 Claims, 9 Drawing Sheets

(51) Int. Cl.
*G06N 3/08* (2023.01)
*G06F 18/21* (2023.01)
*G06F 18/22* (2023.01)
*G06F 18/23* (2023.01)
*G06F 18/2413* (2023.01)
*G06V 10/774* (2022.01)
*G06V 10/778* (2022.01)

(52) U.S. Cl.
CPC ........... *G06F 18/2413* (2023.01); *G06N 3/04* (2013.01); *G06N 3/08* (2013.01); *G06V 10/774* (2022.01); *G06V 10/7784* (2022.01)

(58) Field of Classification Search
CPC .... G06F 18/23; G06F 18/2413; G06F 18/214; G06N 3/04; G06N 3/08; G06N 3/045
USPC ......................................................... 382/158
See application file for complete search history.

(56) References Cited

U.S. PATENT DOCUMENTS

| | | | | |
|---|---|---|---|---|
| 2020/0242404 A1* | 7/2020 | Teshima | ................. | G06N 3/045 |
| 2020/0387797 A1* | 12/2020 | Ryan | ..................... | G06N 3/084 |
| 2021/0027065 A1* | 1/2021 | Chung | ................... | G06N 20/00 |
| 2021/0089827 A1* | 3/2021 | Kumagai | ............ | G06F 18/2132 |
| 2021/0097382 A1* | 4/2021 | Mathews | ................. | G06N 3/08 |
| 2021/0150757 A1* | 5/2021 | Mustikovela | ........ | G06V 10/454 |
| 2021/0182713 A1* | 6/2021 | Kar | ........................ | G06N 5/045 |

OTHER PUBLICATIONS

Fong, et al.: "Net2Vec: Quantifying and Explaining how Concepts are Encoded by Filters in Deep Neural Networks", 2018 IEEE/CVF Conference on Computer Vision and Pattern Recognition, Jun. 18, 2018, pp. 8730-8738, XP033473797.

Lv, et al.: "Multi-scale discriminative Region Discovery for Weakly-Supervised Object Localization", IEEE Transsactions on Cybernetics, XXX(XXX), (2019) arxiv.org, Cornell University Library, pp. 1-12, XP081480892.

Selvaraju, et al.: "Grad-CAM: Visual Explanations from Deep Networks via Gradient-based Localization", arxiv.org, Cornell University Library, (2016), arXiv:1610.02391v4, Dec. 3, 2019, pp. 1-23, XP081556701.

Xie, et al.: "Relating Input Concepts to Convolutional Neural Network Decisions", 31st Conference of Neural Information Processing Systems (NIPS 2017), Long Beach, CA, USA, arxiv.org, Cornell University Library, pp. 1-10, XP080839190.

Zhou, et al.: "Interpreting Deep Visual Representations via Network Dissection", IEEE Transactions on Pattern Analysis and Machine Intelligence, 41(9), (2019), pp. 2131-2145, XP011738337.

* cited by examiner

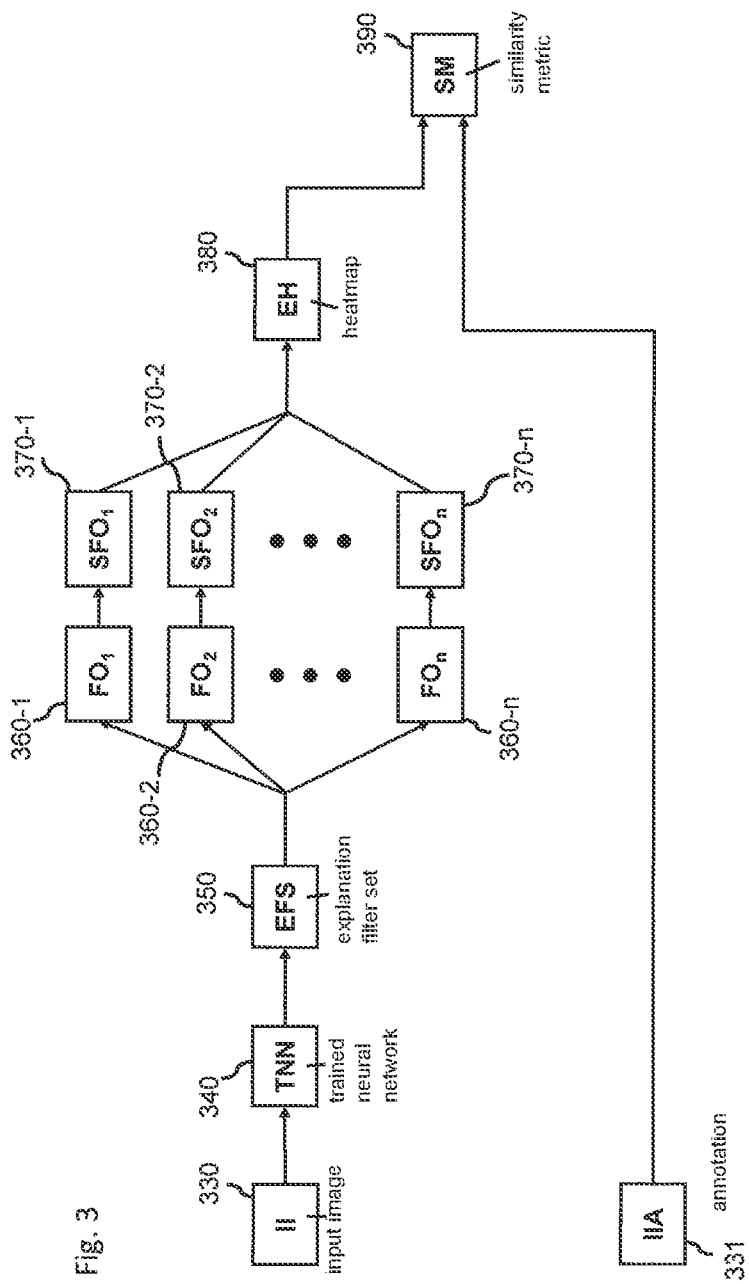

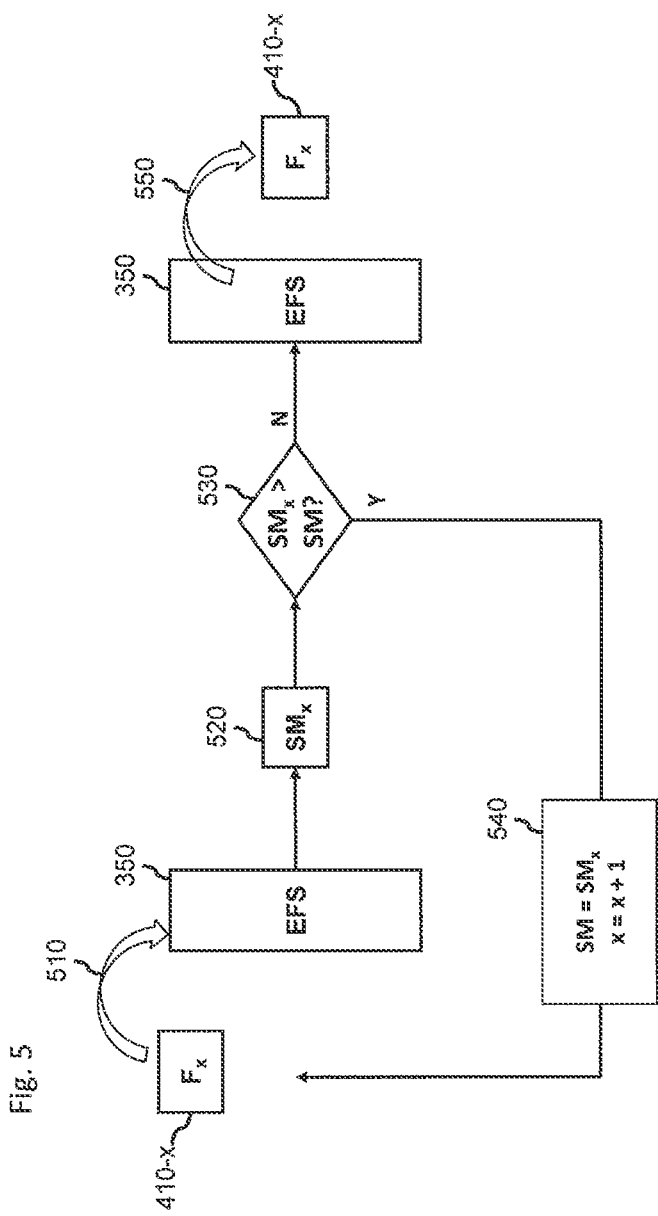

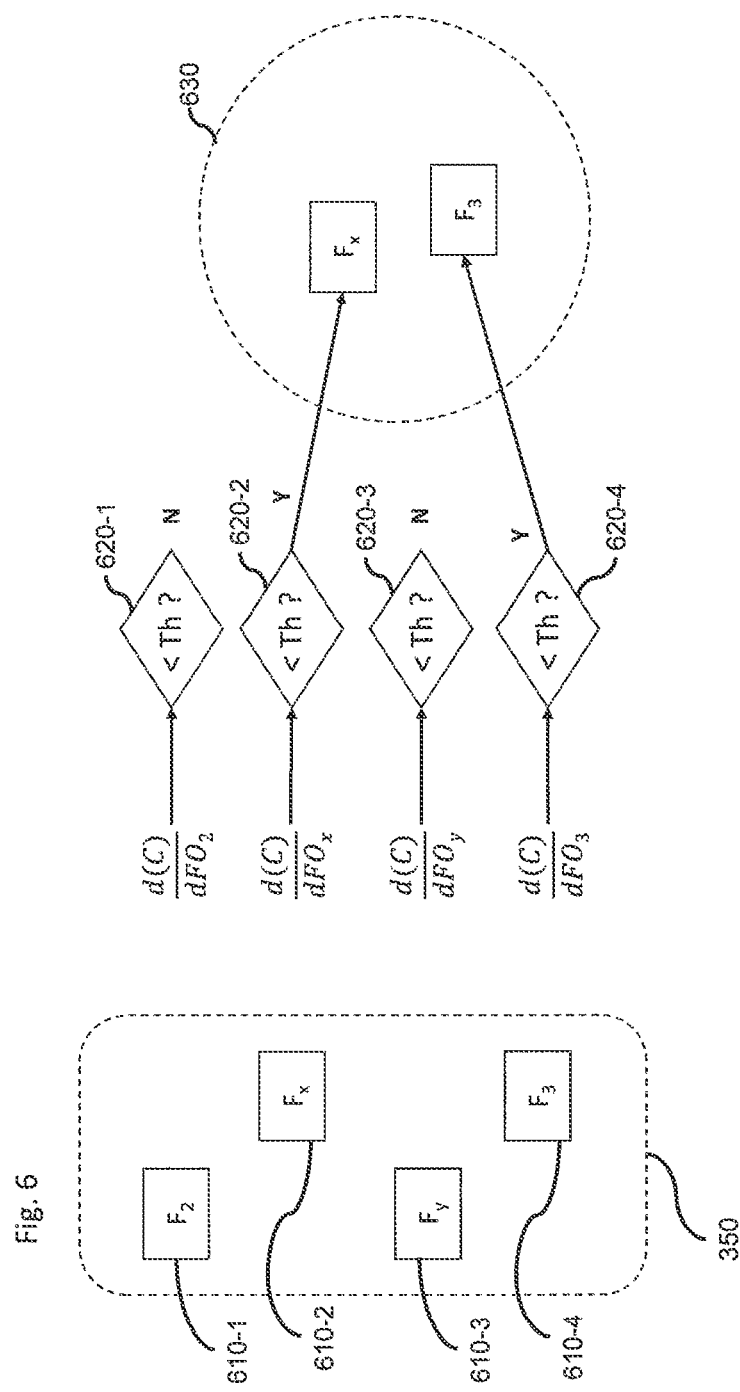

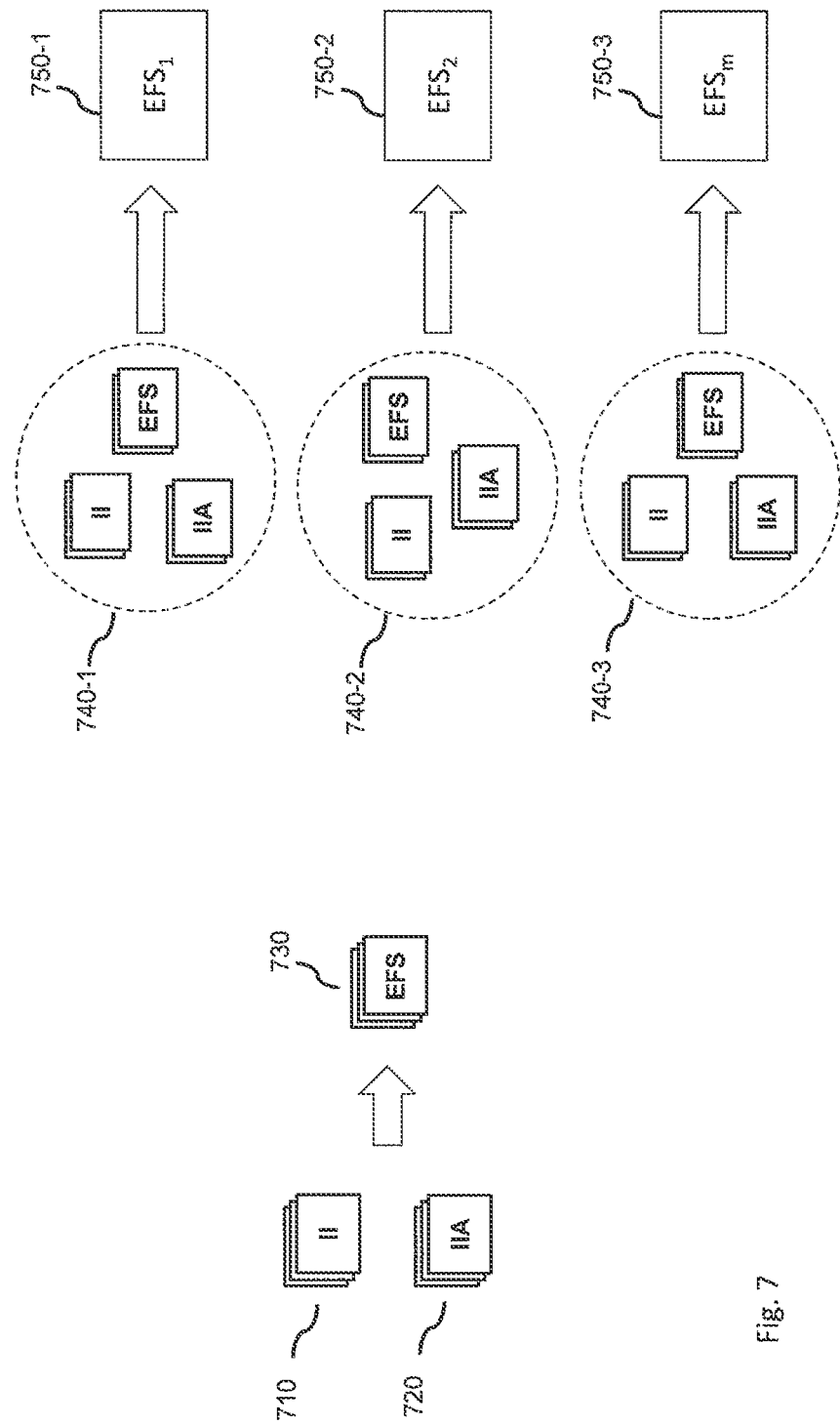

METHOD OF IDENTIFYING FILTERS IN A NEURAL NETWORK, SYSTEM AND STORAGE MEDIUM OF THE SAME

CROSS REFERENCE

The present application claims the benefit under 35 U.S.C. § 119 of European Patent Application No. EP 20156358.2 filed on Feb. 10, 2020, which is expressly incorporated herein by reference in its entirety.

FIELD

The present invention relates to a computer-implemented method of identifying filters for use in determining explainability of a trained neural network, and a corresponding system. The present invention further relates to a computer-readable medium comprising instructions to perform one of the above methods.

BACKGROUND INFORMATION

Machine-learned ('trained') models are widely used in many real-life application domains, such as autonomous driving, robotics, manufacturing, building control, etc. For example, machine learnable models such as neural networks may be trained to infer a state of a physical system, such as an autonomous vehicle or a robot, etc., or the system's environment, e.g., the road on which the vehicle is travelling, the robot's workspace, etc., based on sensor data which is acquired by one or more sensors. Having inferred the state, the physical system may be controlled, e.g., using one or more actuators, or its operation may be monitored.

Generally, as is conventional in machine learning, a machine-learnable model such as a neural network may be trained on training data in order to provide an output, such as a prediction or a decision. An example of a decision is a classification. By training the neural network, the neural network may provide such predictions or decisions without being explicitly programmed to do so. For example, for classifying an image, the neural network may be trained on a training dataset comprising images whose classifications are known. Accordingly, the trained neural network may be trained to determine a classification of an input image. For example, a neural network may be trained as a multiclass identifier, by which an image may be classified as, e.g., "cat", "dog", or "tree". Another example is that the trained neural network may be trained to be a binary classifier (e.g., classifying an input image into one of only two complementary categories, "OK" or "NOK"). However, the trained neural network may also be trained on a dataset of images whose categories are unknown, e.g., obtained by clustering/automatic classification.

In general, neural network may comprise deep neural networks and/or convolutional neural networks (CNNs).

The classifications by machine learned models such as trained neural networks may be used in myriad applications, such as optical quality inspection in manufacturing processes, or hazard detection in autonomous vehicles. It will be understood that in these and other application domains, it is relevant to know and understand how a machine learned model arrives at its conclusion.

Therefore, explainability is a core element of both model verification (did we build the model right?) and validation (did we build the right model?). It is a conventional finding that large, state-of-the-art network models can be easily tricked into providing false, high confidence predictions; and as a consequence, their true generalization performance has often been called into question. As with any other software component intended for deployment in the field, it is critical that the models can be quantitatively verified and validated, e.g., to establish the degree to which a model has learned the desired input-to-output relationship. Current state-of-the-art techniques in machine and deep learning lack metrics and practices to measure this effect, often working with limited (and thus inherently biased) datasets, and producing models that are overparametrized in comparison to the amount of data available. Thus there is often a wide gap between what a model has actually learned and what the implementer thinks the model has learned.

Over the past several years, the need for providing explanations along with model predictions has been recognised, and several approaches have been proposed and used at an academic level with varying degrees of success. In the context of image classification networks, for example, most explanation methods are a mix of black-box (i.e. model-independent) and white-box methods that compute attributions on the pixels of the input image. That is, these methods study the local behaviour of the classifier on a given input. These attribution maps are also often called explanation, saliency or attention maps and are frequently represented as heatmaps overlaid on the input image, where areas of the input image that cause the model to classify the input as one class or another are highlighted.

Explainability of a trained neural network typically involves the use of explanations, which are often subjective. As a simplistic example, one human user may infer that a photograph contains a cat based on the presence of a cat's ears, whilst another human user may rely on the shape of the eyes in order to arrive at the same conclusion. Consequently, a saliency map of a trained neural network may highlight a region of the image that, for the second human user, does not represent the correct features of the cat from which to infer its presence (e.g., if the saliency map instead favours the presence of ears). This may lead to the question of whether the explanation is too subjective, or if the explainability method is not functioning as expected.

There are several conventional examples of machine learning models such as neural networks being inherently biased as a result of an unintentionally biased training dataset. These examples, typically in fields such as law enforcement and justice, have not only highlighted challenges faced in the development of accurate models, but have also caused the public to mistrust the decisions or predictions of these models.

The inventors have therefore identified a need to standardise the explanations (e.g., the visual definition of the cat in the above example) in order to accurately determine whether an explainability method is behaving as expected, and in order for the explainability method to run autonomously on unseen data without the need for human interaction. Moreover, by having a standardised definition for these explanations, hidden biases in the underlying neural network and/or the dataset on which said underlying neural network was trained may be more easily identified.

SUMMARY

In accordance with a first aspect of the present invention, a computer-implemented method of identifying filters is provided. In accordance with another aspect of the present invention, a corresponding computer-readable medium is provided. In accordance with an aspect of the present invention, a corresponding system is provided.

Aspects of the present invention relate to a computer-implemented method of identifying filters for use in determining explainability of a trained neural network. The trained neural network may be configured to determine a classification of an input image by determining a layer output from an internal layer of the trained neural network and determining the classification of the input image from the layer output. The internal layer may comprise a plurality of filters and the layer output may comprise a respective plurality of filter outputs. In accordance with an example embodiment of the present invention, the method may comprise obtaining a dataset comprising the input image and an annotation of the input image. The annotation may indicate at least one part of the input image which is relevant for inferring classification of the input image. The method may further comprise determining an explanation filter set by iteratively: a) selecting a filter of the plurality of filters; b) adding the filter to the explanation filter set; c) computing an explanation heatmap for the input image by resizing and combining an output of each filter in the explanation filter set to obtain the explanation heatmap, the explanation heatmap having a spatial resolution of the input image; and d) computing a similarity metric by comparing the explanation heatmap to the annotation of the input image, until the similarity metric is greater than or equal to a similarity threshold. The method may further comprise outputting the explanation filter set.

The use of an input image having a corresponding annotation may enable a system to determine which filters of a trained neural network are activated during a classification process and to determine whether the classification process occurs as expected. For example, the annotation may represent a standardised explanation that is consistent with the expectations of developers and users. The annotation may thus be akin to an entry in an explanation dictionary.

By considering filters of an internal layer of the trained neural network, it is possible to reduce the influence of adversarial solutions, as the internal layer is typically coarser than the input layer (e.g., the input image). Deeper internal layers are configured to focus on increasingly complex features. Adversarial solutions are less likely to be translated to internal (e.g., deeper convolutional) layers of the trained neural network.

In the determination of the explanation filter set, filters are added to the set individually and after each addition, a similarity metric is determined. In this way, the resulting explanation filter set may be as small as possible and the impact of each filter on the similarity metric may be determined. In order to determine the explanation filter set, the method may comprise iteratively adding filters until the similarity metric meets or exceeds a threshold. By doing so, the method may identify filters that render the explanation heatmap sufficiently similar to the annotation. The similarity threshold may be determined, for example, by a user.

Optionally, determining the explanation filter set comprises removing the filter from the explanation filter set if the similarity metric decreases after adding said filter to the explanation filter set. By doing so, filters which hinder the explanation heatmap (for example, by making the explanation heatmap less similar to the annotation) are not considered. This may therefore improve the accuracy of the explanation filter set.

Optionally, the method further comprises, for each of the plurality of filters, computing a derivative of the classification of the input image with respect to the output of said filter, and ordering the plurality of filters of the internal layer based on their respective derivatives, wherein the filter is selected according to the ordering. By doing so, the determination of the explanation filter set may be more efficient. By ordering the filters in this way, filters with a higher chance of impacting the similarity metric are added earlier, and filters less likely to impact on the similarity metric are added later. Thus, the iterative process may need fewer iterations to reach the explanation filter set whose explanation heatmap is sufficiently similar to the annotation. This speeds up the process and may save computer power and resources, and may also result in a more accurate explanation filter set.

Optionally, selecting the filter comprises using a greedy search strategy to identify a filter of remaining filters of the internal layer not included in the explanation filter set which maximally increases the similarity metric and selecting said identified filter. By doing so, the determination of the explanation filter set may be achieved more efficiently, as the filters with the maximum positive impact on the similarity metric are selected and added to the explanation filter set.

Optionally, obtaining the dataset comprises generating the annotation of the input image by receiving a user input on at least one area of the input image and generating a map, such as a binary map, indicating the at least one area of the input image where the user input is received. This way, a user may input an annotation of an input image intuitively, in such a way that the resulting similarly metric can be obtained using straightforward calculations and computations.

Optionally, the similarity metric comprises at least one of an intersection-over-union measure, a correlation measure, an F1 score and a pixel accuracy value. These similarity metrics may be easily interpreted in order to assess how closely the filters of the explanation filter set correspond to the annotation of the input image, thereby providing an indication of how the model classifies images.

Optionally, the determining of the explanation filter set further comprises iterating over an additional plurality of filters of an additional internal layer. By extending the process over the filters of a preceding internal layer, filters which are highly relevant for classifying the input image that do not belong to the internal layer (but instead belong to a preceding internal layer) may be identified. That is, even in cases where the selected internal layer does not contain all of the key filters responsible for arriving at a particular classification, the process may still identify the key filters, spanning multiple internal layers.

Optionally, the method further comprises identifying any filters of the explanation filter set with respect to which the derivative of the classification of the input image is below an impact threshold, wherein the impact threshold indicates an impact of a filter on the classification of the input image, and outputting the identified filters. The use of an impact threshold may enable the identification of filters which have learned some visual representations which the user considers to be useful in the classification of the input image, but which do not meaningfully affect the classification behaviour of the trained neural network.

Optionally, the dataset comprises a plurality of input images and a respective plurality of annotations of the plurality of input images, and the method further comprises, for each of the plurality of input images of the dataset, determining a respective explanation filter set. Optionally, the method further comprises determining a final explanation filter set by aggregating over the explanation filter set for each of the plurality of images. By applying the process to a plurality of input images and corresponding annotations, it may be possible to generalise the outcomes and identify and group filters that are used in the classification of multiple input images.

Optionally, the dataset comprises a plurality of input images and a respective plurality of annotations of the plurality of input images, and the method further comprises determining a respective explanation filter set for each of the plurality of input images of the dataset, classifying each of the plurality of input images by using the trained neural network, grouping the plurality of input images and the respective annotations of the plurality of input images into one or more clusters based on the classifications of the plurality of input images, and determining a cluster filter set by computing the most frequently occurring filters in the explanation filter sets of the input images in a cluster of the one or more clusters. By clustering the input images, it may be possible to identify an explanation filter set that corresponds to each cluster. Given a previously unseen test sample, it may be possible to first determine a cluster to which the test sample belongs, and then to generate an explanation for the test sample using the explanation filter set for the cluster to which the test sample is determined to belong.

Optionally, the method further comprises receiving a test input image and obtaining a test explanation heatmap by: inputting the test input image to the trained neural network; obtaining filter outputs corresponding to the filters of the explanation filter set; and resizing and combining the obtained filter outputs to obtain the test explanation heatmap, a spatial resolution of the test explanation heatmap being equal to a spatial resolution of the test input image. In this way, filters that have been identified as being important for the identification of particular features can be used in conjunction with a test input image (e.g., a previously unseen input). In other words, a mask may be generated for a test input image using the filter outputs of the filters identified in the explanation filter set.

Optionally, the input image comprises an image-based representation of at least one of a group of: image data, audio data, video data, text data, radar data, LiDAR data and time series data. The method is not limited to only image data, and may be used with any data, once represented in an image-based form. This enables the method to be used for a wide range of applications, for example involving the explainability of classifying audio data.

Optionally, the internal layer is a convolutional layer in the trained neural network, such as the convolutional layer immediately preceding a first dense layer. Deeper convolutional layers of the trained neural network should respond strongly to concepts that are likely to be highly localized in the image. By using the last convolutional layer in a trained neural network, the receptive field of the internal layer will cover more (if not all) of the image, and information on highly localized and complex features may be determined. Additionally, adversarial solutions may be avoided, as it is unlikely that these would be translated to the deeper convolutional layers of the trained neural network.

It will be appreciated by those skilled in the art that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to embodiments of the present invention described by way of example in the following description and with reference to the figures.

FIG. 3 shows a method of determining a similarity metric based on a set of filters according to an example embodiment of the present invention.

FIG. 5 shows a method of adding and/or removing a filter from an explanation filter set according to an example embodiment of the present invention.

FIG. 6 shows a method of identifying low-impact filters according to an example embodiment of the present invention.

FIG. 7 shows a method of determining an explanation filter set based on clustered input images according to an example embodiment of the present invention.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
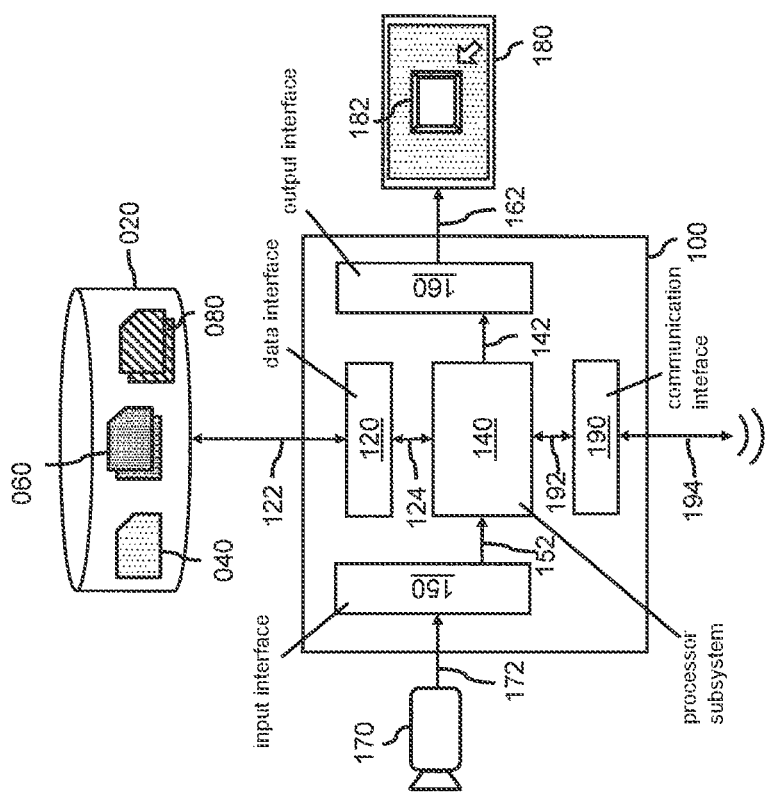
FIG. 1 shows a system for identifying filters for use in determining explainability of a trained neural network according to an example embodiment of the represent invention.

FIG. 1 shows an example system 100 for identifying filters for use in determining explainability of a trained neural network, while FIGS. 2 to 8 further describe a method of the same, with further elucidation.

The system 100 may comprise a data interface 120 and a processor subsystem 140 which may internally communicate via data communication 124. The data interface 120 may be for accessing the trained neural network 040, and optionally an input image in the form of data 060. In some embodiments, a layer output, also referred to as a latent representation or activation volume, of the input image from an internal layer of the trained neural network 040 may also be accessed by data interface 120. The data interface 120 may be for accessing an annotation of the input image in the form of data 080. The annotation of the input image may be obtained from the same storage as the input image, or from another storage location. In some embodiments, the annotation of the input image is received via a user input and subsequently stored locally and/or remotely. The input image and the annotation of the input image form components of a dataset, although in some cases they may be obtained from different sources.

For example, as shown in FIG. 1, the data interface 120 may provide access 122 to an external data storage 020 which may comprise said data 040, 060, 080. Alternatively, the data 040, 060, 080 may be accessed from an internal data storage which is part of the system 100. Alternatively, the data 040, 060, 080 may be received via a network from another entity. In general, the data interface 120 may take various forms, such as a network interface to a local or wide area network, e.g., the Internet, a storage interface to an internal or external data storage, etc. The data storage 020 may take any conventional and suitable form. The annotation of the input image may indicate at least one part of the input image which is relevant for inferring classification of the input image. In some embodiments, the annotation of the input image is received from a human user or from a plurality of human users. For example, the annotation of the input image may be an aggregate or average of annotations of the same input image from multiple users. In some embodiments, the annotation of the input image is obtained from a trained model, such as an external neural network or AI component.

The processor subsystem 140 may be configured to, during operation of the system 100 and using the data interface 120, obtain the input image, the annotation of the input image and the layer output of the input image at the internal layer. In some embodiments, the layer output of the input image may be obtained by inputting the input image to the trained neural network 040 and determining the output from the k-th layer of the trained neural network 040. In other embodiments, the layer output of the input image at the internal layer may have already been determined, and may be readily accessible, e.g., in memory. The structure of an exemplary trained neural network 040 and the layer output(s) will be described in more detail with reference to FIG. 2.

The processor subsystem 140 may be configured to determine an explanation filter set using an iterative process. For example, the processor subsystem 140 may initialise an explanation filter set to be empty. The processor subsystem 140 may then select a filter of a plurality of filters of the internal layer and add the selected filter to the explanation filter set. Two exemplary and non-limiting methods for selecting a filter will be described in detail with reference to FIGS. 4a and 4b. The processor subsystem 140 may be further configured to compute an explanation heatmap from the input image by resizing an output of each filter in the explanation filter set to a spatial resolution of the input image and combining the respective resized output(s) of the filter(s) to obtain the explanation heatmap. Resizing may comprise any method of bringing the spatial resolution of the output(s) to that of the input image. For example, resizing may be performed by scaling, which may comprise upsampling, such as bilinear upsampling, using a series of transposed convolutions, through the use of inverse convolutions, deconvolutions, or via any other means. For example, in a first iteration, the explanation filter set may comprise a single filter. In this case, the output of the single filter may be obtained, for example by inputting the input image to the trained neural network 040 to generate the filter output, and resized to the spatial resolution of the input image. In the first iteration, if only one filter is present in the explanation filter set, the explanation heatmap would merely be the output of the filter resized, e.g., scaled, to the spatial resolution of the input image. The computation of an explanation heatmap will be further described with reference to FIG. 3.

The processor subsystem 140 may be configured to compute a similarity metric by comparing the explanation heatmap to the annotation of the input image. The similarity metric may provide an indication, such as a quantitative measure, of how the output(s) of the filter(s) correspond to the annotation of the input image. The annotation of the input image may correspond to an established or standardised explanation or definition of a particular classification. Thus, the similarity metric may indicate the extent to which the filter(s) of the explanation filter set result in the particular classification of the input image. One example of a similarity metric is an Intersection-over-Union (IOU) measure, also known as the Jaccard index. The IOU involves dividing the overlap (intersection) of the explanation heatmap with the annotation of the input image by the area covered by the combination of the explanation heatmap and the annotation of the input image. In logical terms, the IOU involves dividing the points present in the explanation heatmap AND the annotation of the input image by the points present in the explanation heatmap OR the annotation of the input image, where AND and OR are logical operators.

The processor subsystem 140 may be configured to continue iterating through filters of the internal layer, and in some cases also through filters of another internal layer of the trained neural network 040, until the similarity metric is greater than or equal to a similarity threshold. That is, the iterative process for determining the explanation filter set may continue until the explanation heatmap (e.g., the combined resized outputs of the filters in the explanation heatmap) is sufficiently similar to the annotation (e.g., an accepted or established ground truth explanation). In some embodiments, one or more filters of the explanation filter set may be removed from the explanation filter set, for example if the similarity metric decreases as a result of their addition to the explanation filter set. In other words, in some cases, a filter whose addition to the explanation filter set results in a decrease in similarity metric may be removed from the explanation filter set. This will be described in more detail with reference to FIG. 5.

In some embodiments of the present invention, the processor subsystem 140 may be further configured to identify at least one filter whose output is deemed useful but does not meaningfully contribute to the classification behaviour of the trained neural network 040. For example, the explanation filter set may include at least one filter whose output improves the similarity metric (e.g., renders the explanation heatmap more similar to the annotation of the input image) but does not contribute significantly to how the trained neural network 040 classifies the input image. This may indicate that the trained neural network 040 has not been adequately trained, as it does not take sufficient account of a particular feature indicated in the annotation of the input image. In some embodiments, the processor subsystem 140 may be further configured to identify any such filter(s), generate their respective individual explanation heatmap(s) (e.g., resized output of each filter) and output the identified filter(s) to a user or further processor subsystem. This will be further described with reference to FIG. 6.

The processor subsystem 140 may be further configured to output the explanation filter set. In some embodiments, the processor subsystem may output the explanation filter set to another processing system, network entity, computer program or function, allowing the explanation filter set to be used for, e.g., an automated process or to further refine or train the trained neural network 040. As an optional component, the system 100 may comprise a display output interface 160 or any other type of output interface for outputting the determined mask and/or the perturbed instance obtained by applying the determined mask to the input instance 142 to a rendering device, such as a display 180. For example, the display output interface 160 may generate display data 162 for the display 180 which causes the display 180 to render the determined explanation filter set and/or the corresponding explanation heatmap and/or similarity metric in a sensory perceptible manner, e.g., as an on-screen visualisation 182. For example, determining the explanation filter set may comprise computing an explanation heatmap using the outputs of all of the filters of the determined explanation filter set. In some cases, the last-generated explanation heatmap may be temporarily or permanently stored during the iterative process and retrieved when the explanation filter set is output. In some cases, an explanation heatmap of the determined explanation filter set may be computed as described above and in reference to FIG. 3.

In some embodiments of the present invention, the processor subsystem 140 outputs the explanation filter set in a sensory-perceptible manner, such as on screen or via sound, to a user.

As an optional component, the system 100 may comprise an image input interface 150 or any other type of input interface for obtaining sensor data from a sensor, such as a camera 170. The sensor data may be comprised in the input image. For example, the camera may be configured to capture image data 172, processor subsystem 140 being configured to obtain the input image 152 from image data 172 obtained via input interface 150.

The system 100 may also comprise a communication interface 190 configured for communication 194 with another system or entity, such as an actuator or automated system. For example, the communication interface 190 may be used to transmit an identified explanation filter set to a remote server or entity, such as a network or external device. Communication interface 190 may internally communicate with processor subsystem 140 via data communication 192. Communication interface 190 may be arranged for direct communication with another system, e.g., using USB, IEEE 1394, or similar interfaces.

Communication interface 190 may also communicate over a computer network, for example, a wireless personal area network, an internet, an intranet, a LAN, a WLAN, etc. For instance, communication interface 160 may comprise a connector, e.g., a wireless connector, an Ethernet connector, a Wi-Fi, 4G or 4G antenna, a ZigBee chip, etc., as appropriate for the computer network. Communication interface 190 may also be an internal communication interface, e.g., a bus, an API, a storage interface, etc.

Figure 2:
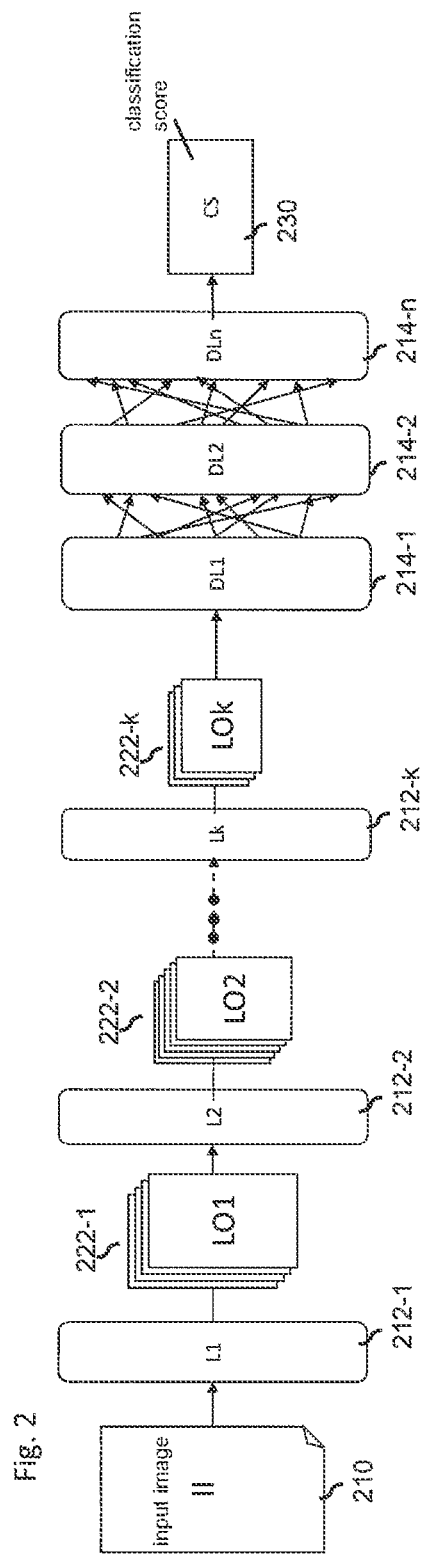
FIG. 2 shows a schematic of a trained neural network, in accordance with an example embodiment of the present invention.

Various details and aspects of the operation of the system 100 will be further elucidated with reference to FIGS. 2 and 3, including optional aspects thereof.

In general, the system 100 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA). In general, each functional unit of the system may be implemented in the form of a circuit. It is noted that the system 100 may also be implemented in a distributed manner, e.g., involving different devices or apparatuses, such as distributed servers, e.g., in the form of cloud computing.

The trained neural network 040 may be parameterized by a set of parameters. The set of parameters may comprise weights of nodes of the trained neural network. For example, the number of layers of the trained neural network may be at least 5 or at least 10, and the number of nodes and/or weights may be at least 1000 or at least 10000. Depending on the particular application, various conventional architectures for neural networks may be used.

FIG. 2 shows a schematic of a trained neural network, such as trained neural network 040 of FIG. 1, which may be accessed by the system 100 of FIG. 1. Various features in FIG. 2 are explained with reference to a system for image classification, but as the skilled person understands, this is not a limitation, as the techniques are readily applied to other kinds of instances. For example, various types of data may be provided in an image-based representation, such as video data, audio data, sensor data (e.g., obtained from a sensor), radar/LiDAR data, and/or time series data.

The process illustrated in FIG. 2 describes, at a high level and greatly simplified, a classification of an input image in a convolutional neural network (CNN), for the sake of illustration. Other types of deep neural networks may also be used, as the skilled person will understand, and the following example is non-limiting and merely exemplary.

CNNs can typically be conceptually divided into two components—a convolutional part, comprising at least one convolutional layer, and a dense (e.g., fully-connected) part, comprising at least one dense layer.

An input image II 210 is input into trained neural network 040 of FIG. 1, more specifically to a first layer L1 212-1 having a plurality of filters (or, in some cases, a single filter). Each of the filters of the first layer L1 212-1 may convolve over the input image II 210, producing a layer output LO1 222-1 (also commonly known as an activation volume or a latent representation), formed of the outputs of the filters. That is, each "slice" of the layer output may be the output of one of said filters. Layer output LO1 222-1 may have a different spatial resolution than the input image II 210. Layer output LO1 222-1 may then be used as an input to the subsequent layer, L2, 212-2. The filter(s) of L2 212-2 may then convolve over layer output LO1 222-1 to produce a second layer output, LO2, 222-2. This process may continue for further layers 212.

It should be noted that throughout the convolutional part of the CNN, the spatial relationship of layer outputs to the input image is preserved, although the spatial dimensions of layer outputs may differ from one layer output to another, and from the spatial dimensions of the input image.

After the last layer Lk 212-$k$ of the convolutional part of the CNN (often referred to as the last convolutional layer, although in some embodiments the last layer Lk of the convolutional part may not necessarily be a convolutional layer, provided it preserves the spatial relationship as discussed above), the resulting layer output LOk is input into the first of the dense layers DL1, 214-1. The dense layers 214 may be fully-connected layers, in which the neurons of each fully-connected layer are connected to all of the neurons in another layer. After passing through the dense part of the CNN, a classification score CS 230 (or set of classification scores) may be output.

Each layer L1, L2 ... Lk may comprise at least one filter. Each filter may be trained to identify particular features, patterns and/or structures in an input image. Filters in deeper layers in the convolutional part of the CNN may be trained to identify more localised and complex structures, whilst filters in shallower layers of the convolutional part of the CNN may be trained to identify more general features such as textures and edges, which may be found throughout the input image. For this reason, it is advantageous to determine the explanation filter set starting with filters from deeper layers of the trained neural network 040. Moreover, adversarial features are less likely to persist through the layers of the convolutional part of the trained neural network 040, so starting with filters from deeper layers may also prevent any adversarial solutions from influencing the determination of the explanation filter set.

FIG. 3 shows a detailed yet non-limiting example of a computer-implemented method of determining a similarity metric based on a set of filters. The method shown in FIG. 3 may be the method performed during each iteration of the determination of an explanation filter set. The method may be performed, for example, by the system 100 of FIG. 1. As in FIG. 2, various features in FIG. 3 are explained with reference to a system for image classification, but as the skilled person understands, this is not a limitation, as the techniques are readily applicable to other kinds of instances, such as sensor data obtained from a sensor.

Shown in FIG. 3 is a trained neural network TNN, 340, trained to classify input images. Trained neural network TNN 340 is a neural network with a latent space, e.g., a space of latent features. For instance, the trained neural network TNN 340 may comprise a deep neural network and/or a CNN.

Shown also in FIG. 3 are an input image II 330 and an annotation IIA 331 of the input image. The annotation IIA 331 of the input image II 330 may be obtained from a user input, in which a user or multiple users input at least one region of the input image II 330 which they deem relevant for the classification of the input image II 330. For example, in an input image of a cat, a user or plurality of users may determine that the ears and eyes of the cat are the aspects most responsible for classifying the cat in the input image as a cat. In some embodiments, the annotation IIA 331 is a ground truth annotation of the input image II 330, established as an accepted or standard definition of a particular classification.

An explanation filter set EFS 350 is also shown, and represents the current explanation filter set for the iteration in progress. Filters can be added (and in some embodiments, removed), at the beginning or end of an iteration, but this is not described with regard to FIG. 3. The selection of a filter to add to the explanation filter set EFS 350 will be described in more detail with reference to FIGS. 4a and 4b, and the addition and/or removal of a filter to/from the explanation filter set EFS 350 will be described in more detail with reference to FIG. 5.

The input image II 330 is input into the trained neural network TNN 340. For each of the filters in the explanation filter set EFS 350, the filter output $FO_1, FO_2, \ldots, FO_n$ 360-1, 360-2, ..., 360-n may be obtained. Each filter output $FO_1, FO_2, \ldots, FO_n$ 360-1, 360-2, ..., 360-n may then be resized to the spatial resolution of the input image II 350, producing a respective resized filter output $SFO_1, SFO_2, \ldots, SFO_n$ 370-1, 370-2, ..., 370-n. A filter output may be resized, e.g., scaled, for example, by means of upsampling such as bilinear upsampling, using a series of transposed convolutions, through the use of inverse convolutions, deconvolutions, or via any other means. In other words, a filter output may be resized through any method than brings the spatial resolution of the filter output to the spatial resolution of the input image.

The resized filter outputs $SFO_1, SFO_2, \ldots, SFO_n$ 370-1, 370-2, ..., 370-n may then be combined, e.g., aggregated, to produce the explanation heatmap EH 380. Accordingly, the explanation heatmap EH 380 will have the same spatial resolution as the input image II 330. In some embodiments, the filter outputs $FO_1, FO_2, \ldots, FO_n$ 360-1, 360-2, ..., 360-n may be combined by any of the methods listed above, and the combined filter output may subsequently be resized to the spatial resolution of the input image II 330.

The explanation heatmap EH 380 may indicate regions of the input image II 330 that are identified by the outputs of the filters of the explanation filter set EFS 350. The explanation heatmap EH 380 may be compared to the annotation IIA 331 of the input image II 330 in order to compute a similarity metric SM 390. The similarity metric may be calculated using an intersection-over-union (IOU) measure, also known as a Jaccard index, a correlation measure and/or a pixel accuracy value. Any other conventional similarity metric may also or alternatively be used.

In some embodiments, the similarity metric for an iteration is temporarily or permanently stored, allowing for a subsequent similarity metric (e.g., of the next iteration) to be compared to the similarity metric obtained in the preceding iteration. This will be described in more detail with reference to FIG. 5.

In some embodiments, the filters of the explanation filter set may be used to generate an explanation heatmap, e.g., a saliency map, for a test input image. The test input image may be an input image that has not previously been seen by the trained neural network. The test input image may be input into the trained neural network and the outputs of the filters identified in the explanation filter set may be resized and combined. For example, the outputs of the filters identified in the explanation filter set may each be resized to the spatial resolution of the test input image and then combined (e.g., aggregated) to obtain a test explanation heatmap. In another example, the outputs of the filters identified in the explanation filter set may first be combined (e.g., aggregated) and the combined filter output may then be resized to the spatial resolution of the test input image to obtain the test explanation heatmap.

Although the above method refers to an input image, data of other forms may also be represented in an image-based form and also used in the method. For example, an audio file may be expressed using an image-based representation, i.e. the audio file may take on the form of an image file, and the above method could be used in the manner described above on the image-representation of the audio file. Similarly, video data, sensor data, radar data, time series data, and the like.

In some embodiments, the input image may be obtained from a sensor, such as a camera, radar/LiDAR system, or the like. The sensor data may be represented as an image and used as an input to the trained neural network. In some embodiments, the input image may be obtained from internal or external storage, via a server, downloaded from an external source, or obtained in any other way.

Figure 4A:
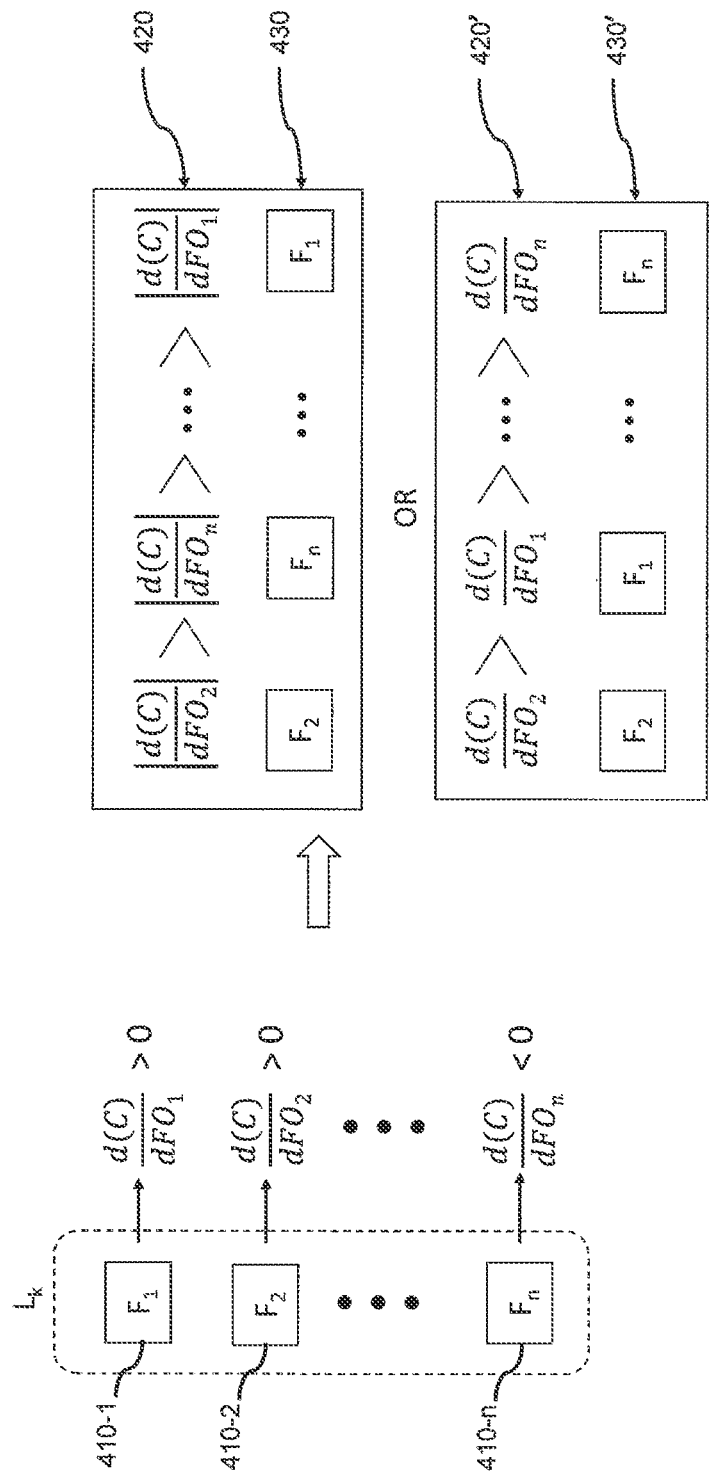
FIG. 4a shows a method of filter selection based on an ordering of a plurality of filters according to an example embodiment of the present invention.
Figure 4B:
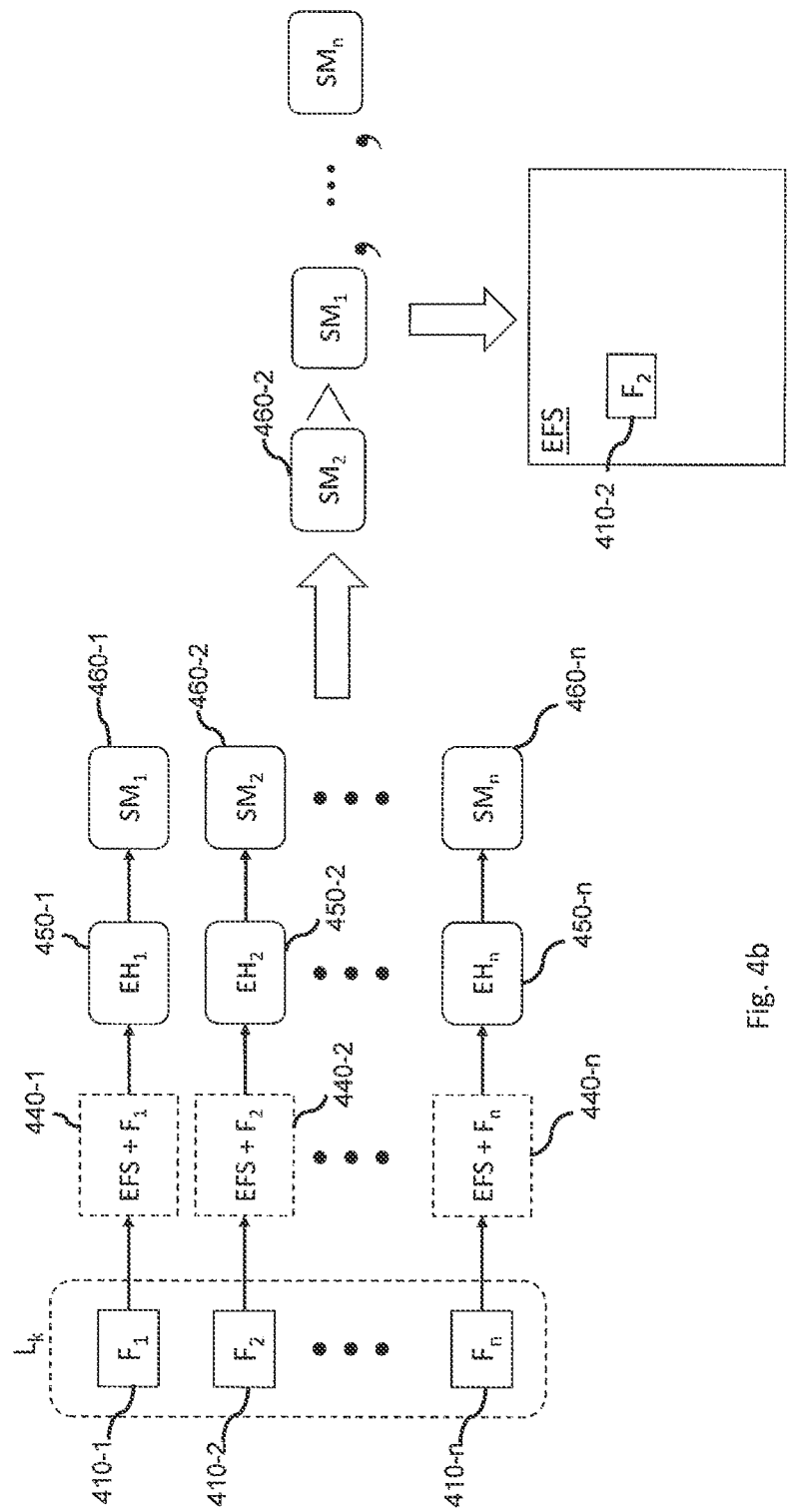
FIG. 4b shows a method of filter selection based on a greedy search strategy according to an example embodiment of the present invention.

FIGS. 4a and 4b show two exemplary methods of filter selection. It is to be understood that these examples are non-limiting and other forms of filter selection may be available and suitable.

FIG. 4a shows a method of filter selection based on an ordering of a plurality of filters according to an embodiment of the invention. Filters $F_1, F_2, \ldots, F_n$ 410-1, 410-2, ..., 410-n represent a plurality of filters in layer k $L_k$. For each filter $F_1, F_2, \ldots, F_n$ 410-1, 410-2, ..., 410-n, the method may comprise computing the derivative of the classification outcome (C) with respect to the output of said filter. For example, for the filter $F_1$ 410-1, the method may comprise calculating $$\frac{d(C)}{dFO_1},$$

where C represents the classification outcome of the input image II 330 and $FO_1$ represents the output of filter $F_1$ 410-1. Filter $F_2$ 410-2 would be used to calculate $$\frac{d(C)}{dFO_2},$$

filter $F_n$ 410-n would be used to calculate $$\frac{d(C)}{dFO_n},$$

and so on.

As is conventional, the derivative may be calculated by summing the derivative of the output neuron with respect to that of each neuron in the specified filter. The method may then further comprise ordering (or sorting) the derivatives. In some embodiments, this may comprise determining the absolute values of each derivative and sorting the derivatives according to their absolute values. The ordering of the derivatives (or their absolute values) may be, for example, a descending order in which the largest magnitude is first in a list 420, or sequence, and the smallest magnitude is last in the list 420. In other embodiments, the method may merely order the derivatives, such as from largest to smallest or vice versa, without determining the absolute values. That is, largely positive derivatives may be listed first whilst largely negative derivatives may be listed last, as illustrated by list 420' in FIG. 4a. In some embodiments, negative derivates (and the corresponding filters) may be ignored completely. The filters corresponding to the ordered derivatives are then similarly ordered in a list 430. For the sake of illustration, FIG. 4a shows an example in which it is found that the derivative of the classification output with respect to the output of the second filter, $F_2$ 410-2, has the greatest magnitude (e.g., largest absolute value) and the derivative of the classification output with respect to the output of the first filter $F_1$ 410-1 has the smallest magnitude (e.g., smallest absolute value), although the derivative of the classification output with respect to filter Fn is negative. Then, in embodiments where the derivatives are sorted according to their magnitude (e.g., absolute value), filter $F_2$ 410-2 would be ordered first in the list 430, and filter $F_1$ 410-1 would be last in the list 430. However, in the embodiments in which the derivatives are sorted directly (e.g., whilst still considering the sign, thus not merely the magnitude), filter $F_2$ 410-2 would be ordered first in list 430', but filter $F_n$ 410-n, being negative, would be ordered last in list 430'.

Filters may then be added to the explanation filter set EFS 350 in the order of the obtained list 430. Following the first example described above and shown in FIG. 4a, in a first iteration of the determination of the explanation filter set EFS 350, filter $F_2$ 410-2 may be selected and added to the explanation filter set EFS 350. That is, during the first iteration, the explanation filter set EFS 350 may contain only filter $F_2$ 410-2. An explanation heatmap EH 380 and subsequently a similarity metric SM 390 may then be determined as described with reference to FIG. 3. If the similarity metric does not meet or exceed a similarity threshold, the method may iterate a second time. The next filter to be added to the explanation filter set EFS 350 would be filter $F_n$ 410-n in the present example, as the absolute value of the derivate of the classification output with respect to the output of filter $F_n$ 410-n is the next largest (according to the present example), and thus filter $F_n$ is second in the list 430. Again, an explanation heatmap EH 380 may be computed from the outputs of filters $F_2$ 410-2 and $F_n$ 410-n, and a similarity metric SM 390 may be determined. If necessary, e.g., if the similarity metric still does not meet or exceed the similarity threshold, the process may iterate again by adding the next-listed filter to the explanation filter set EFS 350 and so on, until the similarity metric meets or exceeds the similarity threshold.

In some embodiments, filters may also be removed from the explanation filter set EFS 350, for example if their addition to the explanation filter set EFS 350 results in a decrease in the similarity metric. Once removed from the explanation filter set EFS 350, the filter may not be considered again and the above selection process may merely proceed to the next filter of the list, as described, without re-adding the removed filter. However, this will be described in more detail with reference to FIG. 5.

If, after considering all of the plurality of filters $F_1, F_2, \ldots, F_n$ 410-1, 410-2, ..., 410-n, (e.g., adding all of the plurality of filters, and/or adding and subsequently removing filters) the similarity metric still fails to meet or exceed the similarity threshold, filters from a preceding layer of the trained neural network, such as filters from layer $L_{k-1}$, may be added in the same fashion as described above. That is, filters from both layers $L_k$ and $L_{k-1}$ may be considered for addition to the explanation filter set. In other words, the list of eligible filters (e.g., filters eligible to be added to the explanation filter set) is expanded to span the previous layer $L_{k-1}$ as well as the original layer Lk. In this way, the method may continue, considering filters from increasingly shallow layers of the trained neural network, until the similarity metric meets or exceeds the similarity threshold. The explanation filter set EFS 350 may thus comprise filters from different layers, and having different spatial resolutions.

FIG. 4b shows another exemplary method of filter selection, based on a greedy search strategy. As in FIG. 4a, an internal layer $L_k$ of the trained neural network 040 may comprise a plurality of filters $F_1, F_2, \ldots, F_n$ 410-1, 410-2, ..., 410-n. At each iteration of the determination of the explanation filter set EFS 350, the greedy search method of filter selection may comprise determining which filter of the plurality of filters $F_1, F_2, \ldots, F_n$ 410-1, 410-2, ..., 410-n would maximally increase the similarity metric. For example, for each filter of the plurality of filters $F_1, F_2, \ldots, F_n$ 410-1, 410-2, ..., 410-n, the method may comprise determining an explanation heatmap from the resized output of said filter and the resized outputs of the filters already present in the explanation filter set EFS 350. A (temporary) similarity metric may then be calculated for each of the plurality of filters $F_1, F_2, \ldots, F_n$ 410-1, 410-2, ..., 410-n. For example, as illustrated in FIG. 4b, a first explanation heatmap $EH_1$ 450-1 is computed based on the output of filter $F_1$ 410-1 and the outputs of the filters of the explanation filter set EFS 350. That is, a combination 440-1 of filter $F_1$ 410-1 and the filters of the explanation filter set EFS 350 are considered. A first similarity metric $SM_1$ 460-1 may then be calculated by comparing the first explanation heatmap $EH_1$ 450-1 to the annotation of the input image.

Similarly, a second similarity metric $SM_2$ 460-2 may be calculated based on a second explanation heatmap $EH_2$ 450-2, generated from a combination 440-2 of the output of filter $F_2$ 410-2 and the outputs of the filters of the explanation filter set EFS 350. The combination 440-2 does not include the output of filter $F_1$ 410-1—the similarity metric $SM_x$ is determined independently for each filter $F_x$ of the layer Lk, without the outputs of other filters of the layer $L_k$ that are not members of the explanation filter set EFS 350. Determining a similarity metric $SM_x$ does not require filter $F_x$ to be added to the explanation filter set EFS 350.

For each of the plurality of filters $F_1, F_2, \ldots, F_n$ 410-1, 410-2, ..., 410-n that are not already members of the explanation filter set EFS 350, a respective similarity metric $SM_1, SM_2, \ldots, SM_n$ is determined as described above. The method may then comprise identifying the largest similarity metric $SM_1, SM_2, \ldots, SM_n$ and consequently identifying the filter whose output, when combined with the outputs of any existing filters in the explanation filter set EFS, resulted in said largest similarity metric. FIG. 4b illustrates an example where $SM_2$ 460-2 is determined to be the largest similarity metric. The corresponding filter, in this case filter $F_2$ 410-2, may then be selected and added to the explanation filter set EFS 350. For example, the filter whose output, when combined with the outputs of the filters of the explanation filter set EFS 350, results in the maximally increased similarity metric, is selected to be added to the explanation filter set EFS 350.

If the similarity metric, in the case of the example illustrated in FIG. 4b, similarity metric $SM_2$ 460-2 does not meet or exceed the similarity threshold, the process repeats for at least a further iteration. In the next iteration, the explanation filter set EFS 350 includes filter $F_2$ 410-2. Thus, the next iteration may comprise determining explanation heatmaps $EH'_1, EH'_3, \ldots, EH'_n$ and subsequently similarity metrics $SM'_1, SM'_3, \ldots, SM'_n$ as described above. These explanation heatmaps may differ from the initially computed explanation heatmaps, e.g., ER, may differ from $EH'_1$, because the composition of the explanation filter set EFS 350 has changed (e.g., filter $F_2$ 410-2 has been added).

When using a greedy search method for selecting filters to add to the explanation filter set EFS 350, the operation of computing an explanation heatmap and subsequently a similarity metric may be performed during the selection process.

In some embodiments, there may be a case where the addition of any further filter of the layer $L_k$ to the explanation filter set EFS 350 would decrease the similarity metric, but the similarity threshold has not yet been met or exceeded. In such cases, the process may continue by considering filters of a preceding layer, such as $L_{k-1}$, in the same way as described above.

Whilst FIGS. 4a and 4b describe two exemplary methods for selecting a filter to add to the explanation filter set EFS 350, it is to be understood that other selection methods may also be used, and the examples provided are non-limiting. For example, it would also be possible to select a filter at random from the plurality of filters $F_1, F_2, \ldots, F_n$ 410-1, 410-2, ..., 410-n, or based on another selection criteria.

FIG. 5 shows a method of adding and/or removing a filter from an explanation filter set according to an embodiment of the present invention. In some embodiments, the addition of a filter to the explanation filter set EFS 350 results in an explanation heatmap that is less similar to the annotation of the input image. In other words, the region or feature identified by such a filter may not contribute to the classification of a "cat" in an input image comprising a cat. For example, a filter may activate on a bird's wing or a street sign, which are not indicated to represent part or all of a "cat" by the annotation of the input image. As another example, a filter may activate on a texture such as fur, which may be present throughout the input image. In this example, the filter output may cover a significant proportion of the input image and may not be particularly useful in the classification of the cat. It may therefore be desirable to remove the filter from the explanation filter set EFS 350 in order to improve the similarity metric and thus identify the filters responsible for, e.g., classifying a cat.

Referring now to FIG. 5, a filter $F_x$ 410-x, e.g., of the plurality of filters $F_1, F_2, \ldots, F_n$ 410-1, 410-2, ..., 410-n of layer $L_k$ as shown in FIGS. 4a and 4b, may be selected and added 510 to the explanation filter set EFS 350. The filter $F_x$ 410-x may be selected, for example, by one of the methods described in either FIG. 4a or FIG. 4b, or by any other means. In an operation 520, a similarity metric $SM_x$ may be computed from the explanation heatmap obtained from the resized outputs of the filters of the explanation filter set EFS 350, as described with reference to FIG. 3.

In operation 530, the similarity metric $SM_x$ may be compared to a similarity metric SM determined in the preceding iteration, e.g., prior to the addition of filter $F_x$ 410-x. If the similarity metric $SM_x$ is greater than similarity metric SM, the process continues to the next iteration, with $F_x$ remaining in the explanation filter set EFS 350. In the next iteration, the similarity metric resulting from the next filter $F_{x+1}$, e.g., $SM_{x+1}$, may be compared to the similarity metric $SM_x$. If the similarity metric $SM_x$ meets or exceeds the similarity threshold, however, the process may terminate and the explanation filter set EFS 350 may be output.

If, however, the similarity metric $SM_x$ is not greater than the similarity metric SM, then the inclusion of the filter output of filter $F_x$ 410-x renders the explanation heatmap less similar to the annotation of the input image. In this case, the filter $F_x$ 410-s is removed from the explanation filter set EFS 350. The process may then proceed to the next iteration, where a filter (other than filter $F_x$ 410-x) may be selected and added to the explanation filter set EFS 350.

In some embodiments, the order of operations may differ. For example, when the greedy search method of selecting a filter is used as described with regard to FIG. 4b, the filter $F_x$ may be added after determining the similarity metric.

In some embodiments, if all of the filters of the layer $L_k$ have been added to the explanation filter set EFS 350, even if one or more of said filters have been subsequently removed from the explanation filter set EFS 350, the iterative process for determining the explanation filter set may continue by considering filters of a preceding layer, such as layer $L_{k-1}$. For example, if the similarity metric for the explanation filter set EFS 350 cannot be increased with any of the remaining or unused filters of the layer $L_k$, e.g., if the addition of any remaining filters (or previously deleted filters) would not increase the similarity metric, the process may continue by considering filters of a previous layer.

FIG. 6 shows a method of identifying low-impact filters according to an embodiment of the invention. In some embodiments, a filter which identifies a feature or region of the input image corresponding to a feature or region indicated in the annotation of the input image may nevertheless have a low or minimal impact on how the trained neural network classifies the image. For example, if an input image comprises a cat, a feature may identify the cat's eyes, which corresponds to the annotation of the input image in which the cat's eyes are indicated as being relevant to the classification of a cat. However, in some cases, the trained neural network may not adequately take into account the filter identifying the cat's eyes—the information may not be used in the overall classification of the cat. In these cases, there may be a problem with the trained neural network, or the trained neural network may need further training and refining in order to take into account features of an object which correspond to an accepted definition or ground truth of the object.

In these cases, it may be beneficial to identify any filters whose outputs correspond to the annotation of the input image but are nevertheless not sufficiently considered in the overall classification of the input image. Any such filters may be identified once the explanation filter set EFS 350 has been determined. For each of the filters $F_2$, $F_x$, $F_y$, $F_3$ 610-1, 610-2, 610-3 and 610-4, the method may comprise determining a derivative of the classification output of the input image with respect to the output of said filter, as described with reference to FIG. 4a. In the example illustrated in FIG. 6, derivatives $$\frac{d(C)}{dFO_2}, \frac{d(C)}{dFO_x}, \frac{d(C)}{dFO_y} \text{ and } \frac{d(C)}{dFO_3}$$

may be obtained in this way. These derivatives may be referred to as impact scores, e.g.

$$\frac{d(C)}{dFO_2}$$

may be referred to as the impact score for filter $F_2$. Each derivative may then be compared 620-1, 620-2, 620-3, 620-4 to an impact threshold Th. The impact threshold Th may be a parameter determined a priori.

If the impact score of a filter is below the impact threshold, then the filter is added to a low-impact filter set 630. In the example of FIG. 6, filter $F_2$ 610-1 is determined to have an impact score above the impact threshold Th, e.g., the derivative of the classification output with respect to the output of filter $F_2$ indicates that the output of the filter $F_2$ plays a sufficiently significant role in the classification of the input image, so filter $F_2$ 610-1 is not added to the low-impact filter set 630. However, filter $F_x$ 610-2 is found to have an impact score below the impact threshold Th, and is therefore added to the low-impact filter set 630. Continuing with the example of FIG. 6, filter $F_y$ 610-3 is determined 620-3 to have an impact score above the impact threshold Th and is therefore not added to the low-impact filter set 630, and filter $F_3$ 610-4 is determined 620-4 to have an impact score below the impact threshold Th and is added to the low-impact filter set 630.

If the filters were selected using the ordered selection method described with reference to FIG. 4a, it may be possible to use the derivative values (which are equivalent to the impact scores) computed in the ordered selection process to avoid the need to recompute the derivatives. In this case, the derivative values for each filter added to the explanation filter set EFS 350 during the determination of the explanation filter set EFS 350 should be temporarily or permanently stored in order to be reused.

Once the low-impact filter set 630 has been determined, the method may comprise outputting the filters of the low-impact filter set 630. In some embodiments, it may also be beneficial to output the impact scores corresponding to the filters of the low-impact filter set 630, and/or their filter outputs. For example, the filter output(s) of filter(s) of the low-impact filter set may be resized to the spatial resolution of the input image and then output to the user in a sensory-perceptible manner, e.g., to allow the user to visualize the area(s) of the input image which are not being properly considered by the trained neural network. In some embodiments, the filters, corresponding impact scores and/or filter outputs may be output to a processor subsystem, either locally or externally, or the like.

Although not illustrated, in some embodiments, filters with respect to which the derivative of the classification output are lowest may be output, for example in terms of their magnitude or in terms of their direct values. For example, the method may comprise outputting the filters and corresponding derivatives of the classification output having the 5 or 10 lowest values, or the filters with respect to which the derivative of the classification output are in the bottom 10% of derivative values may be output.

FIG. 7 shows a method of determining an explanation filter set based on clustered input images according to an embodiment of the present invention. In some embodiments, the method may comprise obtaining a plurality of input images II 710 and respective annotations IIA 720 of the plurality of input images II 710. The method may comprise determining an explanation filter set for each of the plurality of input images II 710, using the corresponding annotation of the plurality of annotations IIA 710, according to any of the methods described herein. That is, the method may comprise determining a respective explanation filter set for each of the plurality of input images II 710, resulting in a respective plurality of explanation filter sets EFS 730.

In some embodiments, a final explanation filter set may be obtained by aggregating over the plurality of explanation filter sets EFS 730. For example the aggregation may comprise identifying filters present in many (such as a majority) or all of the plurality of explanation filter sets EFS 730. The final explanation filter set may comprise the most frequently occurring filters of the plurality of explanation filter sets EFS 730. The final explanation filter set may comprise filters from multiple layers of the trained neural network. Thus, explanations for new, previously unseen data may be computed by generating an explanation heatmap using the outputs of the filters of the final explanation filter set in the same manner as described above.

In some embodiments, the plurality of input images II 710 may be clustered, for example, based on their classifications. In some embodiments, the plurality of input images II 710 are clustered by some conventional clustering algorithm, such as k-means clustering or deep feature matching. For example, each of the plurality of input images II 710 may be classified by the trained neural network. Based on the obtained classifications, the input images II 710, along with their respective annotations and explanation filter sets, may be grouped into one or more clusters 740-1, 740-2 and 740-3. A cluster filter set 750-1, 750-2, 750-3 may then be determined, for example, by identifying the most frequently occurring filters in the explanation filter sets of said cluster, or by aggregating the explanation filter sets of said cluster.

When a previously unseen test sample, e.g., input image, is obtained, its corresponding cluster may be found. The filters learned for the corresponding cluster, e.g., the cluster filter set for said cluster, may then be used to generate an explanation heatmap for the test sample.

Figure 8:
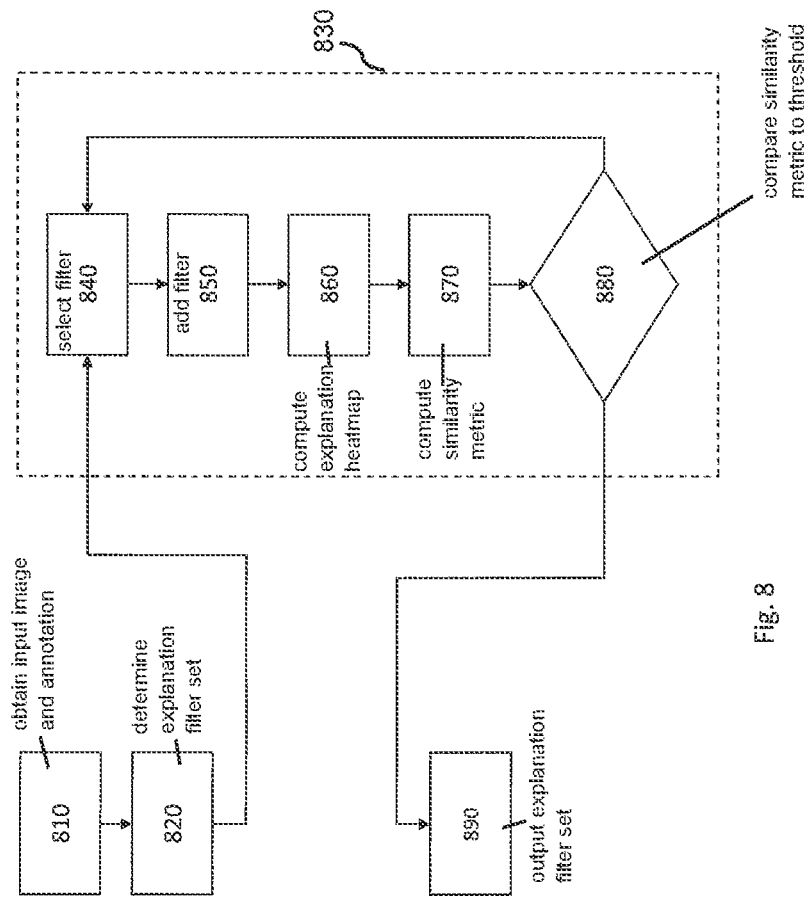
FIG. 8 shows a computer-implemented method of identifying filters for use in determining explainability of a trained neural network according to an example embodiment of the present invention.

FIG. 8 shows a block-diagram of computer-implemented method 800 of identifying filters for use in determining explainability of a trained neural network. The method 800 may correspond to an operation of the system 100 of FIG. 1. However, this is not a limitation, in that the method 800 may also be performed using another system, apparatus or device.

The method 800 may comprise, in an operation entitled "OBTAINING INPUT IMAGE AND ANNOTATION", obtaining 810 the input image and a corresponding annotation of the input image. The annotation of the input image may be obtained from an internal or external storage, or may be obtained via a user input. For example, both the input image and the corresponding annotation of the input image may be stored in a database or data storage location, and both may be obtained therefrom. In another example, the input image is obtained and displayed, e.g., on a rendering device, and a user (or multiple users) may directly input an annotation for the input image. This may involve clicking or touching (e.g., on a touchscreen) areas of the input image which are relevant for classifying the image in a particular class.

The method may further comprise, in an operation entitled "DETERMINING EXPLANATION FILTER SET", determining 820 an explanation filter set. The determining of the explanation filter set may be an iterative process. In particular, the operation of determining an explanation filter set may comprise initializing an explanation filter set, e.g., as an empty set. The iterative process is illustrated in FIG. 8 as dashed box 830. The operations therein may be repeated for each iteration of the process of operation 820.

During an iteration of the process for determining the explanation filter set, the method may comprise, in an operation entitled "SELECTING FILTER", selecting 840 a filter of a plurality of filters of an internal layer of the trained neural network. A filter may be selected through any selection means, such as those described with reference to FIGS. 4a and 4b. The method may further comprise, in an operation entitled "ADDING FILTER TO EXPLANATION FILTER SET", adding 850 the selected filter to the explanation filter set. The selected filter may be added to the explanation filter set, for example, as described with reference to FIG. 5. The method may further comprise, in an operation entitled "COMPUTING EXPLANATION HEATMAP", computing 860 an explanation heatmap. The explanation heatmap may be computed by resizing the filter output(s) of the filter(s) included in the explanation filter set to the spatial resolution of the input image and combining the resized filter output(s). In some embodiments, the filter output(s), such as those having the same spatial resolution, are combined prior to being resized to the spatial resolution of the input image. The filter output(s) may be resized through any resizing means, e.g., scaling, such as by upsampling, such as bilinear upsampling, or by using a series of transposed convolutions, through the use of inverse convolutions, deconvolutions, or any other means. The method may further comprise, in an operation entitled "COMPUTING SIMILARITY METRIC", computing 870 a similarity metric. The similarity metric may be computed by comparing the explanation heatmap generated in operation 860 to the annotation of the input image obtained in operation 810. The similarity metric may be, for example, an intersection-over-union measure (IOU), also known as a Jaccard index, a correlation measure and/or a pixel accuracy value.

Optionally, in some cases, the computed similarity metric may be compared to the similarity metric obtained in a preceding iteration. If the similarity metric of the current iteration is less than that of the preceding iteration, the filter added in operation 850 of the current iteration may be removed from the explanation filter set. In such cases, the method may continue by merely returning to operation 840 and selecting another filter.

The method may further comprise, in an operation entitled "COMPARING SIMILARITY METRIC TO THRESHOLD", comparing 880 the similarity metric obtained in operation 860 to a similarity threshold. The similarity threshold may be predetermined. If, in operation 880, the similarity metric is greater than the similarity threshold, the method may proceed to an operation entitled "OUTPUTTING EXPLANATION FILTER SET", which involves outputting 890 the explanation filter set. The explanation filter set may be output in a user-perceptible manner, for example visually on a rendering device such as a display, and/or may be output to a processor subsystem or external entity, such as a server or function.

If, however, it is determined that the similarity metric is not greater than the similarity threshold in operation 880, the method may repeat the iteration by returning to operation 840. In this case, another filter, such as from the plurality of filters of layer $L_k$ of the trained neural network, may be selected, added, and used to compute a further explanation heatmap, and so on.

In some embodiments, for example if all of the filters of a layer have been considered (e.g., added to the explanation filter set) and the similarity metric still does not meet or exceed the similarity threshold the iterative process may continue, selecting and adding filters of a preceding layer of the trained neural network to the explanation filter set.

Optionally, the method may further comprise identifying low-impact filters of the explanation filter set, as described with reference to FIG. 6.

It will be appreciated that, in general, the operations of method 800 of FIG. 8 may be performed in any suitable order, e.g., consecutively, simultaneously, or a combination thereof, subject to, where applicable, a particular order being necessitated, e.g., by input/output relations. In some embodiments, for example, a filter may be added to the explanation filter set after the corresponding similarity metric is calculated. This may be the case, for example, if a greedy search strategy was employed to select a filter, as described with reference to FIG. 4b.

Figure 9:
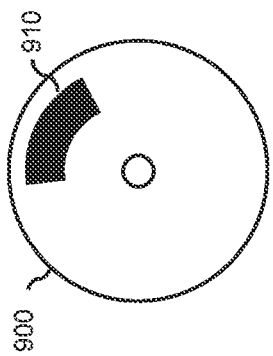
FIG. 9 shows a computer-readable medium comprising data according to an example embodiment of the present invention.

The method(s) may be implemented on a computer as a computer implemented method, as dedicated hardware, or as a combination of both. As also illustrated in FIG. 9, instructions for the computer, e.g., executable code, may be stored on a computer readable medium 900, e.g., in the form of a series 910 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 9 shows an optical disc 900. Alternatively, the computer readable medium 900 may comprise transitory or non-transitory data 910 representing decoder model data for predicting object feature vectors of multiple interacting physical objects as described herein; and/or encoder model data for classifying pairwise interactions between multiple physical objects into a set of multiple interaction types as described herein.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In a device enumerating several means, several of these means may be embodied by one and the same item of hardware. The mere fact that certain measures are described separately does not indicate that a combination of these measures cannot be used to advantage.

What is claimed is:

1. A computer-implemented method of identifying filters for use in determining explainability of a trained neural network, the trained neural network being configured to determine a classification of an input image by determining a layer output from an internal layer of the trained neural network and determining the classification of the input image from the layer output, the internal layer including a plurality of filters and the layer output including a respective plurality of filter outputs, the method comprising the following steps:
obtaining a dataset including the input image and an annotation of the input image, the annotation indicating at least one part of the input image which is relevant for inferring classification of the input image;
determining an explanation filter set by iteratively:
selecting a filter of the plurality of filters,
adding the selected filter to the explanation filter set,
computing an explanation heatmap for the input image by resizing and combining an output of each filter in the explanation filter set to obtain the explanation heatmap, the explanation heatmap having a spatial resolution of the input image, and
computing a similarity metric by comparing the explanation heatmap to the annotation of the input image,
until the similarity metric is greater than or equal to a similarity threshold; and
outputting the explanation filter set.

2. The method of claim 1, wherein the determining of the explanation filter set includes removing the filter from the explanation filter set when the similarity metric decreases after adding the filter to the explanation filter set.

3. The method of claim 1, further comprising:
for each filter of the plurality of filters, computing a respective derivative of the classification of the input image with respect to the output of the filter; and
ordering the plurality of filters of the internal layer based on their respective derivatives;
wherein the filter is selected according to the ordering.

4. The method of claim 1, wherein the selecting of the filter includes using a greedy search strategy to identify a filter of remaining filters of the internal layer not included in the explanation filter set which maximally increases the similarity metric and selecting the identified filter.

5. The method of claim 1, wherein the obtaining of the dataset includes generating the annotation of the input image by receiving a user input on at least one area of the input image and generating a map indicating the at least one area of the input image where the user input is received.

6. The method of claim 1, wherein the similarity metric includes at least one of an intersection-over-union measure, a correlation measure and a pixel accuracy value.

7. The method of claim 1, wherein the determining of the explanation filter set further includes iterating over an additional plurality of filters of an additional internal layer.

8. The method of claim 1, further comprising:
identifying any filters of the explanation filter set with an impact score below an impact threshold, the impact score of each filter being based on a derivative of the classification of the input image with respect to the filter, wherein the impact score indicates an impact of the filter on the classification of the input image, and outputting the identified filters.

9. The method of claim 1, wherein the dataset includes a plurality of input images and a respective plurality of annotations of the plurality of input images, the method further comprising:
for each of the plurality of input images of the dataset, determining a respective explanation filter set; and
determining a final explanation filter set by aggregating over the explanation filter set for each of the plurality of input images.

10. The method of claim 1, wherein the dataset includes a plurality of input images and a respective plurality of annotations of the plurality of input images, the method further comprising:
for each of the plurality of input images of the dataset, determining a respective explanation filter set;
classifying each of the plurality of input images by using the trained neural network;
grouping the plurality of input images and the respective annotations of the plurality of input images into one or more clusters based on the classifications of the plurality of input images; and
determining a cluster filter set by computing most frequently occurring filters in the explanation filter sets of the input images in a cluster of the one or more clusters.

11. The method of claim 1, further comprising:
receiving a test input image; and
obtaining a test explanation heatmap by:
inputting the test input image to the trained neural network,
obtaining filter outputs corresponding to the filters of the explanation filter set, and
resizing and combining the obtained filter outputs to obtain the test explanation heatmap, a spatial resolution of the test explanation heatmap being equal to a spatial resolution of the test input image.

12. The method of claim 1, wherein the input image includes an image-based representation of at least one of: image data, and/or audio data, and/or video data, and/or text data, and/or radar data, and/or LiDAR data, and/or time series data.

13. The method of claim 1, wherein the internal layer is a convolutional layer in the trained neural network, wherein the internal layer immediately precedes a first dense layer.

14. The method of claim 1, wherein the combining the outputs of each of the filters in the explanation filter set includes aggregating the outputs.

15. A non-transitory computer-readable storage medium on which is stored a computer program for identifying filters for use in determining explainability of a trained neural network, the trained neural network being configured to determine a classification of an input image by determining a layer output from an internal layer of the trained neural network and determining the classification of the input image from the layer output, the internal layer including a plurality of filters and the layer output including a respective plurality of filter outputs, the computer program, when executed by a computer, causing the computer to perform the following steps:
- obtaining a dataset including the input image and an annotation of the input image, the annotation indicating at least one part of the input image which is relevant for inferring classification of the input image;
- determining an explanation filter set by iteratively:
  - selecting a filter of the plurality of filters,
  - adding the selected filter to the explanation filter set,
  - computing an explanation heatmap for the input image by resizing and combining an output of each filter in the explanation filter set to obtain the explanation heatmap, the explanation heatmap having a spatial resolution of the input image, and
  - computing a similarity metric by comparing the explanation heatmap to the annotation of the input image,
- until the similarity metric is greater than or equal to a similarity threshold; and
- outputting the explanation filter set.

16. A system configured to identify filters for use in determining explainability of a trained neural network, the trained neural network being configured to determine a classification of an input image by determining a layer output from an internal layer of the trained neural network and determining the classification of the input image from the layer output, the internal layer comprising a plurality of filters and the layer output comprising a respective plurality of filter outputs, the system comprising:
- a data interface for obtaining a dataset including the input image and an annotation of the input image, the annotation indicating at least one part of the input image which is relevant for inferring classification of the input image;
- a processor subsystem configured to:
  - determine an explanation filter set by iteratively:
    - selecting a filter of the plurality of filters,
    - adding the filter to the explanation filter set,
    - computing an explanation heatmap for the input image by resizing and combining an output of each filter in the explanation filter set to obtain the explanation heatmap, the explanation heatmap having a spatial resolution of the input image, and
    - computing a similarity metric by comparing the explanation heatmap to the annotation of the input image,
  - until the similarity metric is greater than or equal to a similarity threshold; and
  - output the explanation filter set.

* * * * *